(No Model.)　　　P. S. BUCKMINSTER.　　2 Sheets—Sheet 1.
WATER WHEEL.

No. 525,002.　　　　Patented Aug. 28, 1894.

WITNESSES:　　　　　　　　　INVENTOR, (No Model.) 2 Sheets—Sheet 2.

P. S. BUCKMINSTER.
WATER WHEEL.

No. 525,002. Patented Aug. 28, 1894.

WITNESSES:
T. J. Hogan.
J. E. Gaither.

INVENTOR,
P. S. Buckminster
by J. Snowden Bell
Att'y.

UNITED STATES PATENT OFFICE.

PRESCOTT S. BUCKMINSTER, OF ANGEL'S CAMP, CALIFORNIA.

WATER-WHEEL.

SPECIFICATION forming part of Letters Patent No. 525,002, dated August 28, 1894.

Application filed October 10, 1893. Serial No. 487,774. (No model.)

*To all whom it may concern:*

Be it known that I, PRESCOTT S. BUCKMINSTER, of Angel's Camp, in the county of Calaveras and State of California, have invented a certain new and useful Improvement in Water-Wheels, of which improvement the following is a specification.

My invention relates more particularly to water wheels of the class or type which operate by the impact of a column of water applied under a comparatively high head, and its object is to provide simple and convenient means by which to effectively and accurately regulate the delivery of water to the buckets so as to maintain a uniform determined speed of the wheel.

To this end, my invention consists in certain novel devices and combinations hereinafter fully set forth.

Figure 1:
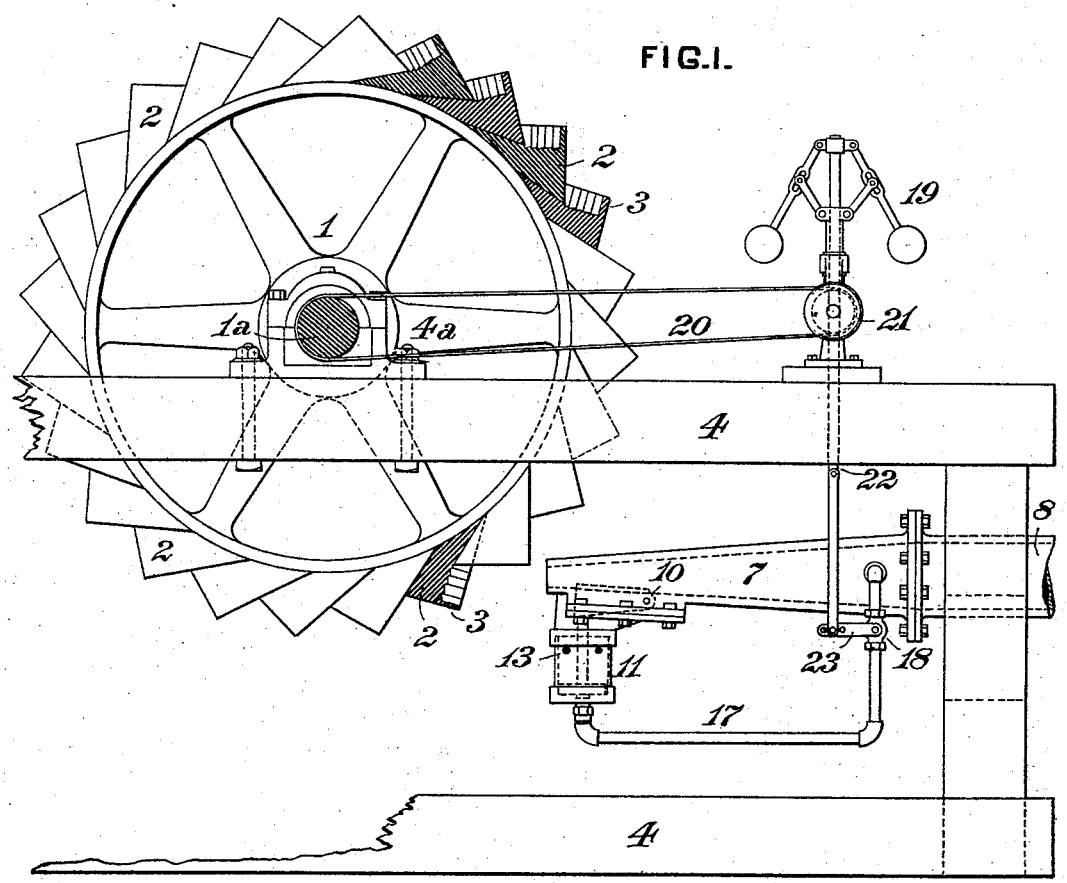
Figure 2:
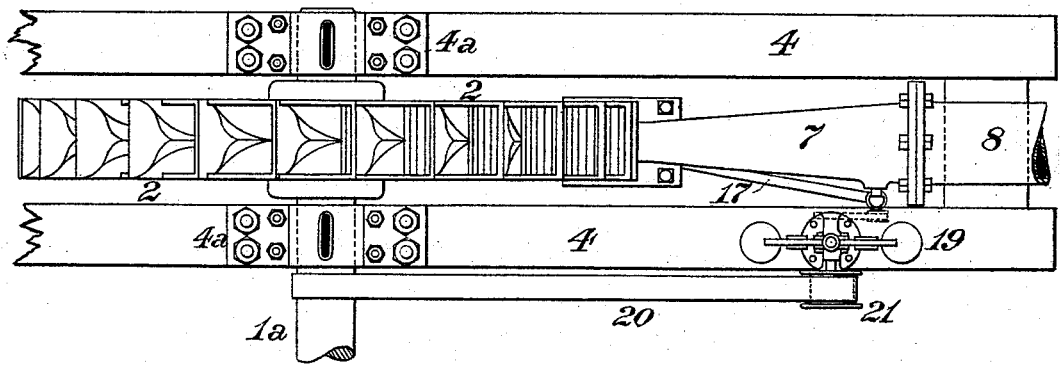
Figure 3:
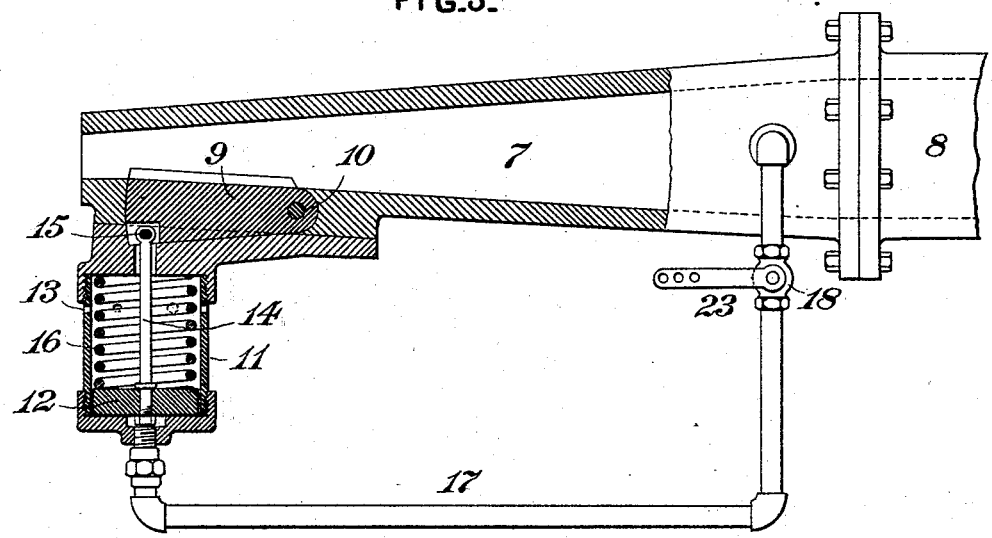
Figure 4:
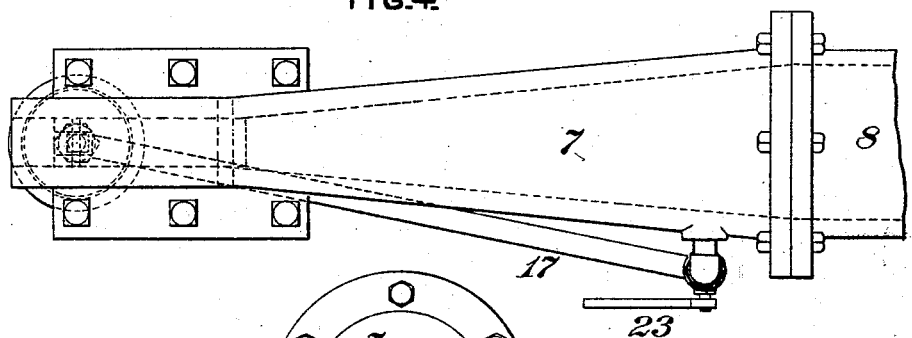
Figure 5:
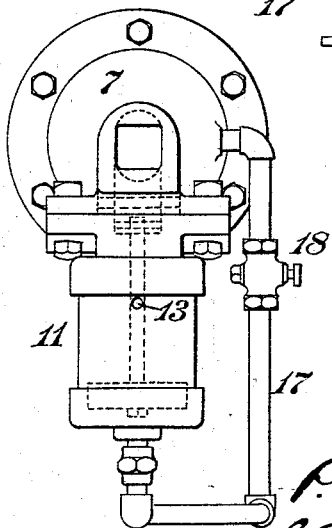

In the accompanying drawings: Figure 1 is a side view, partly in elevation and partly in section, of an impact water wheel, illustrating an embodiment of my invention; Fig. 2, a plan or top view of the same; Fig. 3, a side view, partly in elevation and partly in section, and on an enlarged scale, of the water delivery nozzle and its connections; Fig. 4, a plan or top view, and Fig. 5, an end view of the same, and Fig. 6, a section through the cylinder, tongue, and portion of the nozzle, showing modifications of detail.

My invention is herein exemplified as applied in connection with an impact wheel having a center or body 1, formed of a hub, arms, and rim, and a series of buckets 2, formed upon or fixed to the rim of said center, but it will be obvious that the buckets may, if desired be cast upon a rim which is connected to a hub by a disk or disks, in the ordinary manner. The wheel is secured upon a horizontal shaft 1ᵃ, which is journaled in bearings 4ᵃ, upon a suitable supporting frame 4, and is in practice, provided with a driving pulley or gear wheel for the transmission of power to the mechanism to be operated.

Water for the actuation of the wheel is delivered to the series of buckets 2 by a conical or tapering nozzle 7, secured to, and forming the discharge section of a pipe 8, leading from a reservoir or other source of supply, said discharge nozzle conveying water in line with and from its supply. The delivery of water from said nozzle is regulated, so as to maintain a uniform determined rotative speed, by an adjustable tongue or reducer 9, which is adapted to effect the variations of discharge area of the nozzle 7 requisite for the purpose, and is varied and controlled in position by a governor or regulator, actuated by the wheel, through intermediate connections presently to be described. The nozzle 7 is preferably formed with a continuous and uniform taper in vertical section, as shown in Fig. 3, while in horizontal section, it is tapered uniformly, from its junction with the supply pipe 8 to or near the rear of the tongue 9, and thence continues with parallel sides to its outlet as shown in Fig. 4, its outlet being substantially square or rectangular, with filleted corners, as in Fig. 5.

The tongue 9 is planed truly on its sides, and fitted in a correspondingly finished recess in the lower side of the body of the nozzle 7, so as to maintain a continuous close fitting working contact with the recess. It is pivoted to the nozzle by a pin or bolt 10, adjacent to its rear end, and, when not in operation, or when the maximum discharge of the nozzle is being effected, its upper side stands in line with the lower inside face of the nozzle, so as to present no obstruction to the free passage of water through and out of the same. A cylinder 11, provided with a loosely fitting piston 12, and having one or more discharge ports 13, near its top, is connected to the lower side of the nozzle, with its axial line slightly in rear of the front end of the tongue 10, and the rod 14, of the piston 12, which passes freely through an opening in the lower side of the nozzle, is coupled, by a pin 15, to the tongue 10, near its front end. The piston 12 is normally held at the bottom of the cylinder 11, by a tension spring 16, bearing upon its upper side, and, when in such position, the tongue 10 will be held in its lowest position, that is to say, with its top flush with the lower inside surface of the nozzle 7, as in Fig. 3. A water supply pipe 17, controlled by a regulating cock or valve 18, leads into the bottom of the cylinder 11, from any suitable source of supply, in this instance the nozzle 7, but it may receive its supply from any other point in the water column or from an independent water column having sufficient pressure. Where, as is frequently the case, the water supplied contains considerable sand and sediment, the cylinder 11 may be vented below the piston, or a suitable filter may be interposed in the supply pipe 17, between the regulating cock 18 and the cylinder. A governor or regulator 19, which, in this instance, is shown as of the ordinary ball type, but which may be of any other suitable and preferred construction, is mounted on the wheel frame 4, and is driven by the water wheel, through a belt 20, passing around the wheel shaft 3, or a pulley thereon, and around a pulley 21 on the frame of the governor. It may, however, if found more convenient or desirable, be driven from a countershaft rotated by the water wheel. The stem 22, of the governor, is coupled, at its lower end, to an arm 23, fixed to the regulating cock 18, so as to open and close the same, in greater or less degree, coincidently with, and proportionately to, variations in the position of the governor balls corresponding to tendencies to variations of speed of the water wheel by which the governor is actuated.

In operation, when water is turned upon the wheel by the opening of the ordinary supply gate, the tongue 9 will be and remain entirely clear of the passage way through the nozzle, until the wheel attains its desired and determined speed, when the governor will, through its stem 22 and the arm 23, act upon the regulating cock 18, and open it sufficiently to allow water to flow through the supply pipe 17 and enter the cylinder 11, thereby raising the piston 12 and the connected tongue 9, so as to contract the passage way through the nozzle 7, and, by reducing the discharge of water upon the wheel, will prevent increase in its speed. Upon a decrease in speed, the cock 18 will be correspondingly closed by the governor, and the water below the piston will escape past it and through the upper discharge port or ports 13, permitting the piston and tongue to be lowered and the passage way through the nozzle increased in area. During operation, the regulating cock will be constantly held open to a sufficient degree to admit to the cylinder all the water that can escape past the piston without raising it, such condition being requisite in order to prevent spasmodic action. It will be observed that the outlet end of the nozzle, or, necessarily, only the top thereof, is sufficiently in advance of the front end of the tongue to prevent the stream from being deflected by the elevation of the tongue in contracting the passage way through the nozzle.

It will be readily seen that under a high or heavy head of water, the pressure upon the inner surface of a contracted nozzle is considerable, and the actuation of any controlling or reducing member therein is correspondingly difficult. By the utilization of the pressure of water taken from the pressure column passing through the nozzle, or from an equally strong one, to act on a piston of sufficient and suitable area, operating the controlling or reducing member, as in my above described construction, said member is put in substantial equilibrium, and may be operated with corresponding facility, by varying such pressure, so that by governing the flow of water to the piston, and permitting a constant leakage flow past it, the flow through the nozzle may be easily controlled, and the action of the piston is made analogous to that of a dash pot.

A further advantage of my improvement is found in the fact that the reduction of discharge area by the tongue is effected by a natural contraction at its front end, without interposing any rear shoulder or obstruction which would check the velocity flow of the whole stream passing through the nozzle, as is the case with butterfly valves and other prior controlling or reducing devices.

Figure 6:
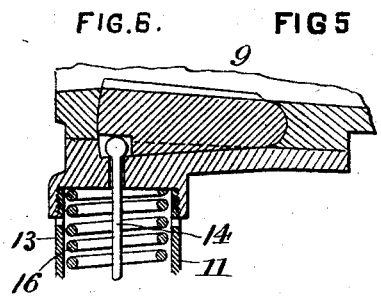

While I have shown the tongue or reducer as coupled positively to the rod of the actuating piston, and deem such to be the preferable construction, it will be obvious that it is not an essential, as the coupling pin or bolt may be dispensed with, if desired, and the piston rod allowed to merely abut against the lower side of the tongue, so as positively to effect only its upward movements, in which case it will be moved downwardly by its own gravity and the water pressure acting at and near its free end, when released from the upward pressure of the piston. It will also be seen that the pivot of the tongue may be omitted, and, as a mechanical equivalent therefor, the rear end of the tongue may be socketed in the recess, so as to have a hinged connection with the nozzle, which admits of its movement therein, in the same manner, and with the same result and relation to other members of the appliance, as if pivoted specifically as shown. The above modifications are shown in Fig. 6.

The specific construction of water wheel herein illustrated does not form part of my present invention, and a wheel provided with buckets of the form shown, but not described, herein, constitutes the subject matter of a separate application filed by me November 16, 1893, Serial No. 491,149.

I claim as my invention and desire to secure by Letters Patent—

The combination of a discharge nozzle, a tongue or reducer pivoted thereto, a fluid pressure cylinder having an upper discharge or relief port, a piston fitting loosely in said cylinder and having a rod adapted to transmit pressure from the piston to the tongue or reducer, a spring exerting downward pressure upon the piston, a supply pipe leading from a water pressure column to the cylinder, below the piston, a regulating cock controlling said supply pipe, and a governor actuating said regulating cock, substantially as set forth.

PRESCOTT S. BUCKMINSTER.

Witnesses:
GEO. H. FOX,
THOS. G. PEACHEY.